Dec. 22, 1931. W. E. GHENT 1,837,321
SEED TREATING MACHINE
Filed July 23, 1929 3 Sheets-Sheet 2

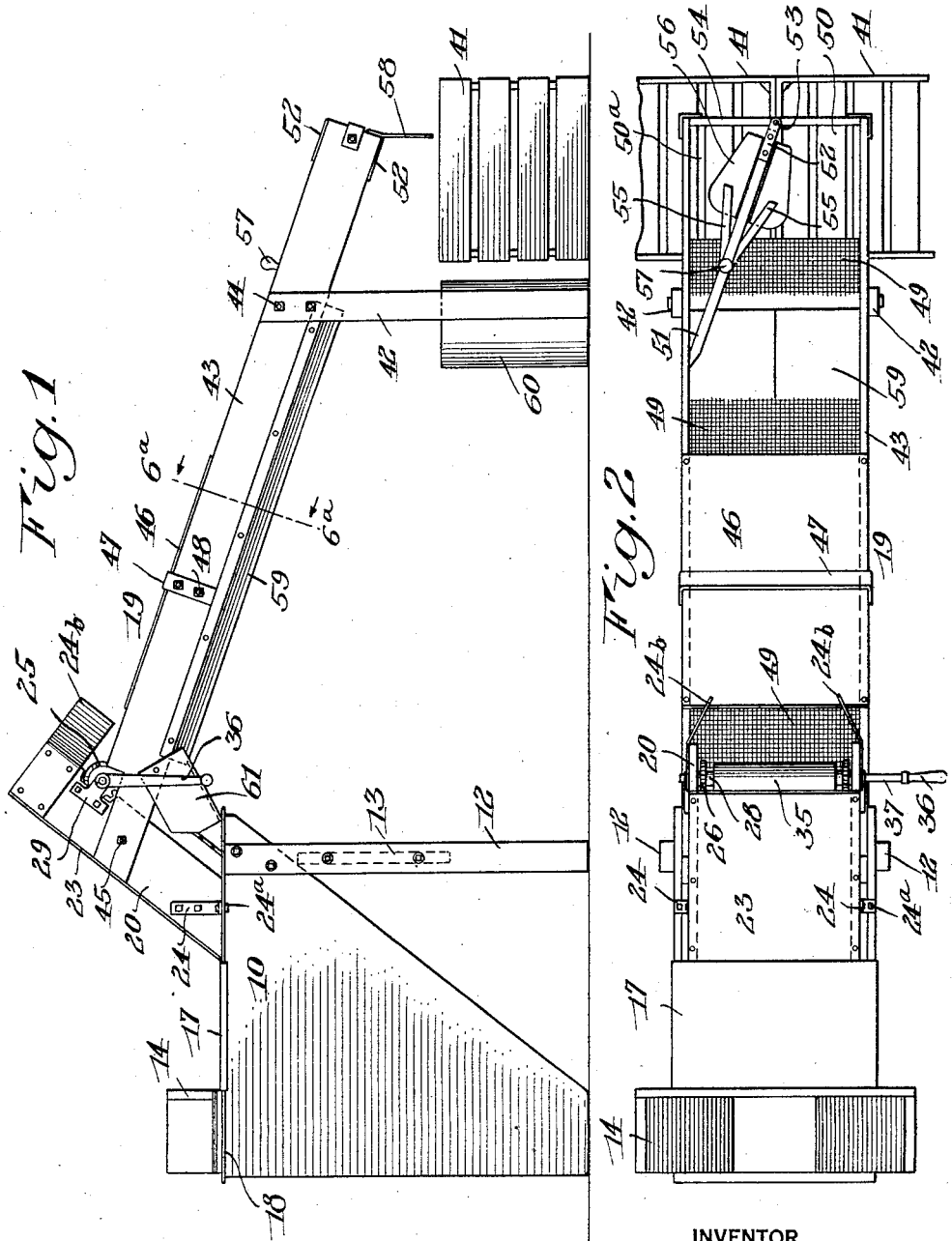

INVENTOR
William E. Ghent
BY
Cumpston & Griffith
his ATTORNEYS

Dec. 22, 1931.  W. E. GHENT  1,837,321
SEED TREATING MACHINE
Filed July 23, 1929   3 Sheets-Sheet 3
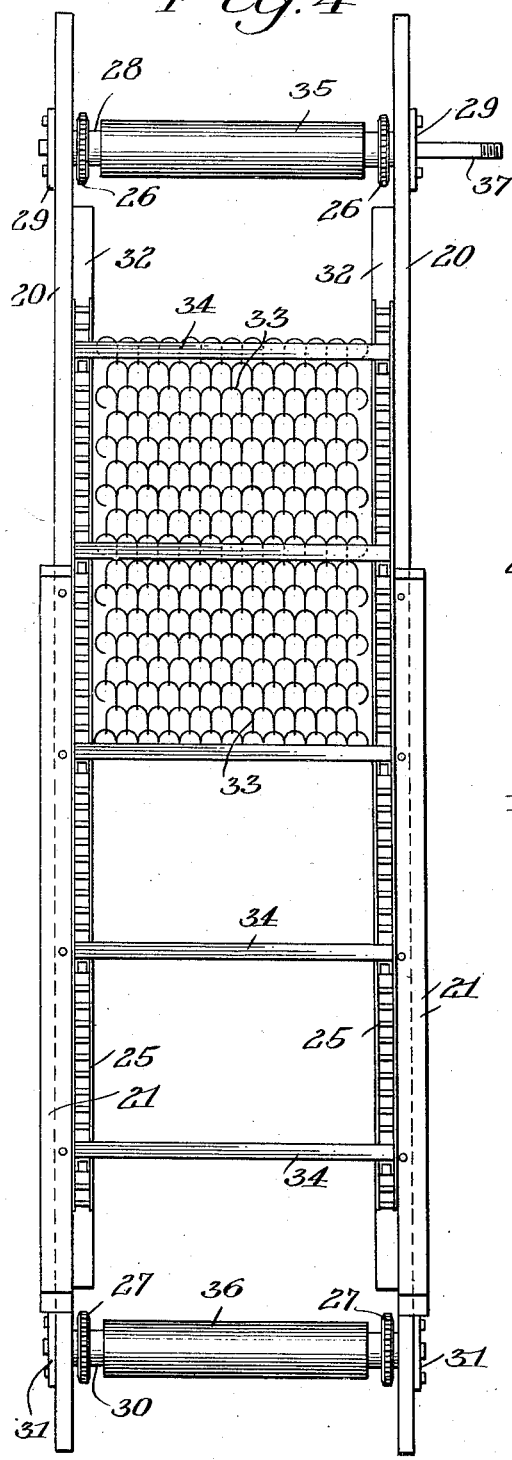
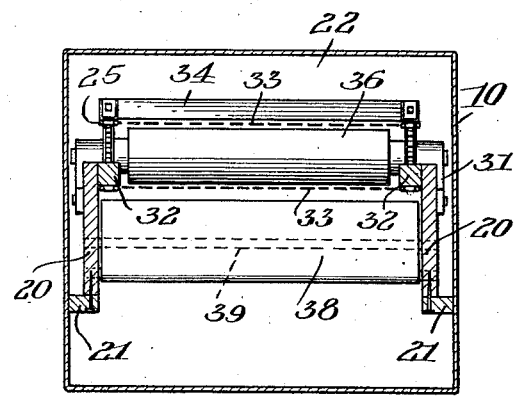
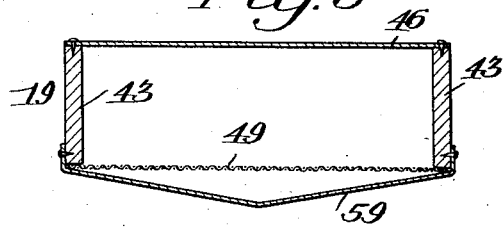
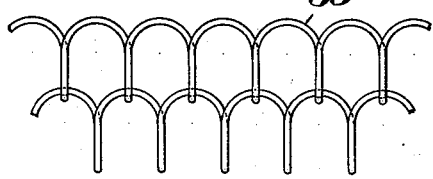
INVENTOR
William E. Ghent
BY
Cumpston & Griffith
his ATTORNEYS Patented Dec. 22, 1931

1,837,321

UNITED STATES PATENT OFFICE

WILLIAM E. GHENT, OF ATLANTA, NEW YORK, ASSIGNOR TO BOGGS MANUFACTURING CORPORATION, OF ATLANTA, NEW YORK, A CORPORATION OF NEW YORK

SEED TREATING MACHINE

Application filed July 23, 1929. Serial No. 380,376.

The present invention relates to seed treating machines and has for its object to provide an improved machine of this class which is comparatively simple in construction, convenient to operate and efficient in service, and which is particularly adapted for treating seed potatoes, onions, and the like.

A further object of the invention is to provide improved means for both agitating the fluid employed for treating or coating the seed and for conveying the seed from the fluid, together with means for effecting the discharge of the seed into suitable receptacles whereby it is made unnecessary for the attendant or operator of the machine to subject his hands to the injurious effects of the fluid, which is of a nature effective to destroy or repel all bugs, insects and the like, which may attack the seed either before or after planting.

A further object of the invention is to provide an improved elevating unit for conveying the seed from the liquid which can be inserted within and removed from the tank in which the seed are deposited, either for cleaning or for treating and coating as may be desired.

A further object of the invention is to provide improved means for conserving the drippings discharging from that portion of the seed elevating means projecting from the tank and also from the seed transfer means in order that the liquid may be collected and returned to the tank.

A further object of the invention is to provide a seed treating machine of the class described embodying a plurality of separately constructed units capable of being quickly assembled and detached and which can be stored or packed in a comparatively small space when not in use.

To these and other ends the invention resides in certain improvements and combinations of parts, all as will be hereinafter more fully described, the novel features being pointed out in the claims at the end of the specification.

In the drawings:

Fig. 1 is a side elevation of a machine embodying the invention;

Fig. 2 is a top plan view of the same;

Fig. 4 is a plan view of the elevator with parts of the belt omitted;

Fig. 5 is a transverse section taken on line 5a—5a of Fig. 3;

Fig. 6 is a transverse section through the chute for discharging the seed, taken on line 6a—6a of Fig. 1, and Fig. 7 is a detailed view showing the manner of constructing the wire mesh belt for elevating the seed.

Similar reference numerals throughout the several views indicate the same parts.

Figure 3:
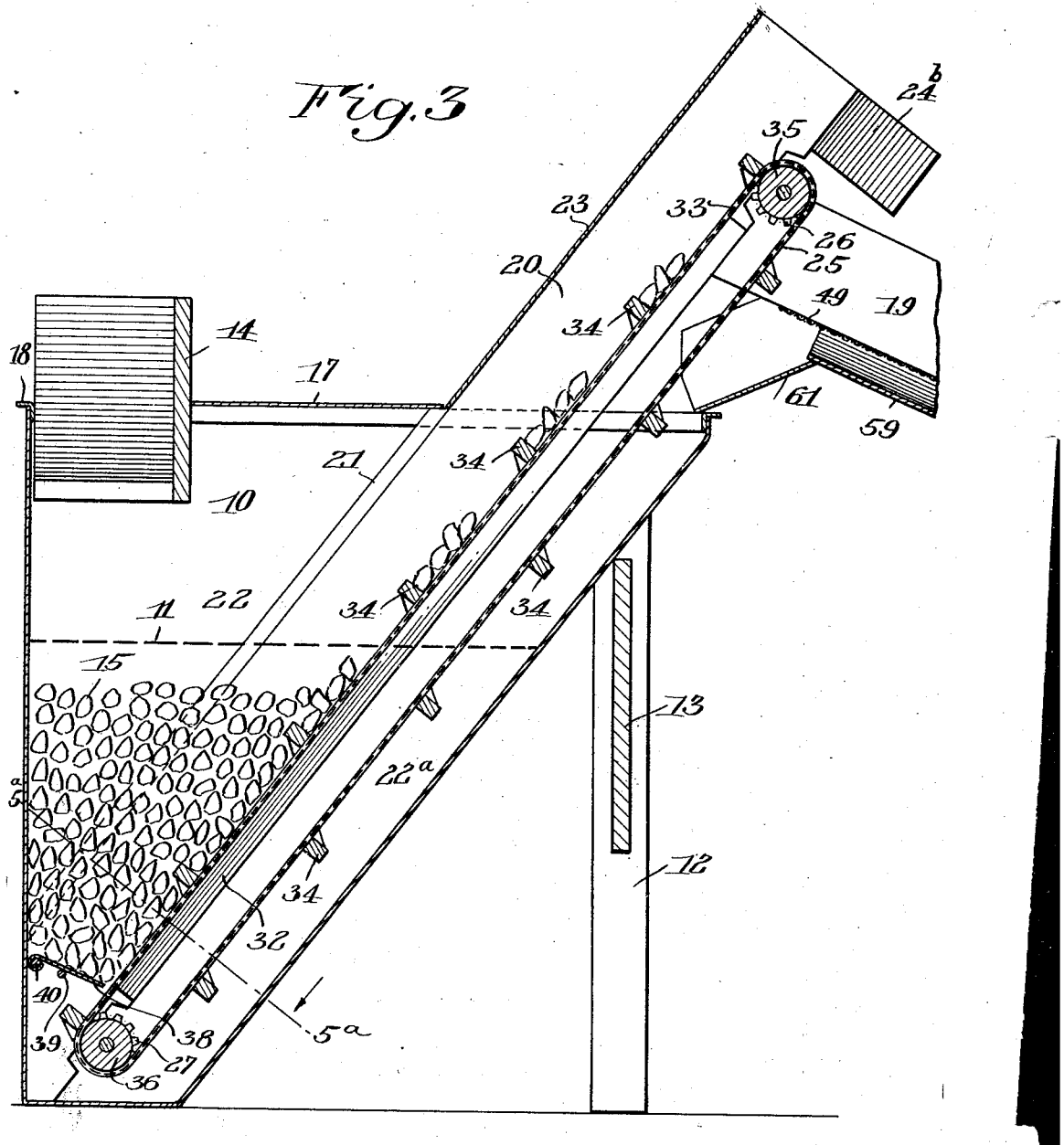
Fig. 3 is an enlarged sectional elevation showing the construction of the liquid holding tank and the elevating means for conveying the seed therefrom.

The present invention embodies a machine designed for the economical treatment of seed of different kinds to protect them against attack by insects, bugs, or the like either by washing, impregnating or coating the seed with a suitable fluid or liquid. The materials constituting the liquid or treating solution are highly injurious to all insects or the like which may attack the seed after treatment or which may be thereon during the treating operations. The machine is designed to carry out the treating process in a manner making it unnecessary for the attendant to place his hands within the solution or to handle the seed impregnated therewith as has been necessary heretofore. It is further designed as a labor saving machine and as one adapted to increase the effectiveness of the treatment over previous methods employed and to make it possible to treat a relatively large quantity of seed in a comparatively short time either of the whole or cut variety. Furthermore, it conserves the solution and saves all of the mixture except that necessary for proper coating of the seed or seed pieces. It eliminates the drudgery of the present wire basket method of treating or cleaning the surfaces of the seed and embodies unitary forms of construction which can be quickly assembled or disconnected and packed or stored in a comparatively small space when not in service.

While the machine is particularly adapted for treating seed potatoes, it can be used for treating various kinds of seed of different sizes. The elevating means for the seed is such that it can if desired be made to eliminate all seed portions below a given size which may not be suitable for planting.

Referring to the drawings, 10 represents a tank for holding the solution, the level of which is indicated by the dotted line 11 in Fig. 3. The tank is provided at its rear end with a pair of supports 12 connected by a transverse member 13, the supports being connected at their upper ends to the sides of the tank. The tank has a removable hopper 14 at its front end for discharging the seed 15 into the solution carried by the tank. The hopper is removable to permit the cover plate 16 for the tank to be partially withdrawn for a purpose described hereinafter, the cover plate being flanged at 17 to slide on the guides 18 formed on the side walls of the tank as shown in Fig. 1.

The elevating unit for agitating the solution and for conveying the seed from the tank is best shown in Figs. 3 and 4 and is readily insertible within and withdrawable from the tank without removal of any of its parts. Any suitable means may be provided for receiving the seed from the elevating unit but I prefer to provide a chute 19 for transferring or delivering them to the desired point. The elevating unit comprises a pair of side rails 20 extending within the tank and having their lower ends abutting the front wall thereof as indicated in Fig. 3. The rails are spaced from the side walls of the tank by strips 21, Fig. 5, which in effect constitute parts of the rails disposed in engagement with said walls to form closed joints for preventing escape of the seed from the front compartment 22 to the rear compartment 22a. The upper ends of the side rails are connected by a transverse cover plate 23 overlying the elevator belt as shown in Fig. 3. The upper end of the elevating unit is supported by means of angular brackets 24 secured to the side rails 20 and detachably connected with the flanges 18 of the tank by means of bolts 24a. Upon the upper ends of the side rails are secured plate members 24b which extend below the rails and are inclined inwardly as shown in Fig. 2 to insure delivery of the seed into the center of the chute 19.

The elevator preferably includes a pair of sprocket chains 25 each of which engages a pair of upper and lower sprockets 26 and 27 respectively, Fig. 4. The sprockets 26 are fixed on a shaft 28 journaled in suitable bearings 29 carried by the side rails 20. The lower sprockets 27 are fixed on a shaft 30 having its opposite ends journaled in bearings 31 also carried by the side rails. The chains 25 are adapted to travel on supporting strips 32 secured upon the inner faces of the side rails and serving to prevent sagging of the chains. Any suitable belt may be provided for elevating the seed such for example as that indicated at 33 which is preferably of the wire mesh type and which includes a plurality of transversely extending slats 34 suitably connected with the chains and constituting a portion of the elevating means for conveying the seed to the chute 19. The upper and lower sprocket shafts 28 and 30 are preferably provided with rollers 35 and 36 respectively to facilitate the movement of the belt while the sprocket shaft 28 is being rotated to advance the chains. The power for driving the belt is preferably applied to the sprocket shaft 28 at the upper end of the elevating unit and any suitable driving means may be employed, such as an electric motor (not shown) or a hand crank 36, shown by way of example in the present embodiment and which is fixed on an extended portion 37 of the sprocket shaft 28. When turning the crank to operate the belt the latter will serve to constantly agitate the solution within the tank thereby keeping the materials of the solution thoroughly mixed so that settling of the particles of the solution is prevented. This method avoids the necessity of stirring the solution by hand as has been the practice heretofore and the belt therefore performs the double function of agitating the solution and elevating the seed or seed portions after they have become impregnated with or coated by the mixture.

The bottom of the seed holding compartment comprises a plate 38 positioned slightly above the lower sprocket shaft and is adapted to cooperate with the belt to prevent escape of the seed downwardly to the bottom of the tank or to a point below the belt. The plate 38 extends the full width of the tank and is pivotally supported on the forward end thereof at 40 whereby it is free to be swung upwardly a slight amount by the advancing slats 34 on the belt, the plate being immediately returned by the weight thereon to normal position where it is held by a transverse rod 39, the ends of which are suitably secured to the side walls of the tank. It will thus be seen that said bottom plate and said elevating unit serve to divide the tank into separate compartments in both of which the liquid is free to circulate while the seed are confined to the front compartment.

The belt proper is preferably constructed of a series of wire link sections 33 shown on an enlarged scale in Fig. 7. This form of belt has been found very satisfactory for the purpose intended, but it will be understood that any type of flexible belt may be used which is perforated or provided with openings for the escape of the drippings from the seed while they are being elevated. It will be further understood that the size of the mesh will be such as to prevent the seed from dropping through the belt, but in cases where very small seed pieces which are undesirable for planting may find their way through the belt openings they will discharge to the bottom of the tank and can be removed from time to time.

The chute 19 for receiving the seed from the elevator is inclined at such an angle as to insure their discharge by gravity into the crates or receptacles 41 placed beneath the lower end of the chute. The chute is supported at its lower end by a pair of upright members 42 having their upper ends detachably connected with the sides 43 of the chute by a suitable number of bolts 44. The upper ends of the sides 43 are detachably connected with the side rails 20 of the elevator unit by means of bolts 45 which when withdrawn will permit the chute and elevator units to be readily separated.

The side walls of the chute are connected at their top edges by a plate 46 and a tie strap 47 is extended over the plate and has its ends bent downwardly to engage said walls to which said ends are secured by bolts 48. To the lower edges of the side walls is secured a perforated bottom 49, preferably in the form of a wire screen on which the seed are deposited when discharging from the elevator and upon which they travel downwardly for discharge through either of the openings 50 or 50a in the lower end of the chute which are in registry with the receptacles 41.

Means is provided for deflecting the seed for passage through either of the openings whereby the seed can be discharged first into one of the receptacles and then into the other, which is advantageous for the reason that while either one of the receptacles is being removed and emptied the other will be in position to receive the seed discharging from the chute. This means is in the form of a deflector comprising a vertically disposed plate 51 having secured to its upper and lower edges a pair of arms 52 pivotally connected at 53 to the central portion of the lower end plate 54 of the chute, Fig. 2. Secured to the plate 51 and inclined relatively thereto are deflector plates 56 for directing the seed to the opposite openings 50 and 50a of the chute upon swinging the plate 51 from one position of adjustment to another. A horizontally disposed plate 56 occupies a position substantially in the plane of the screen 49 and is suitably secured to the plate 51 and if preferred, to the deflectors 55. The plate 56 in either position of adjustment, constitutes means cooperating with the adjacent wall portions of the chute to form the openings through which the seed are alternately discharged to the receptacles 41. The pivoted member is provided with an upstanding handle portion 57 permitting the operator to swing the deflector from one position of adjustment to another.

A guard 58 depends from the lower end 54 of the chute to a point adjacent the receptacles 41 whereby to better insure the passage of the seed into the receptacles when discharging from the chute.

Beneath the chute for the greater portion of its length is a channel or trough-like member 59 the sides of which are suitably secured to the sides 43 of the chute as shown in Figs. 1 and 6. The bottom of the trough is in spaced relation to the screen 49 and is adapted to catch the drippings from the seed descending upon the screen. Beneath the lower end of the trough is disposed a container 60 for receiving the solution discharging from the trough and at suitable intervals the contents of the container can be emptied into the tank whereby the supply is conserved and the cost of operation reduced.

A second trough 61 extends between the upper end of the trough 59 and the tank for returning to the latter that portion of the solution which drips from the belt when passing over the sprocket shaft 28. The trough 61 is secured to the sides of the chute by any suitable means.

In the operation of the machine, after the desired amount of solution has been placed in the tank, the whole or cut portions of the seed to be treated are emptied into the hopper for discharge into the mixture. By constant operation of the elevating belt, either manually or by a power unit, agitation of the solution is insured and a constant shifting of the seed is effected whereby to insure coating or treating of all parts thereof before transferring the seed from the solution to the chute 19. When the seed are discharged by the belt into the chute they will be carried down by the action of gravity and discharged into one or the other of the receptacles 41 depending upon the position of the deflector which is adjustably mounted in the lower end of the chute. As soon as one receptacle has been filled the deflector will be shifted to permit discharge of the seed into the other. The supply of seed within the tank may be replenished when desired and by keeping the machine in constant operation the time required to complete the treatment of a given quantity of seed may be reduced to a mininum.

By removing the bolts 45 the chute can be readily withdrawn from the elevator unit. Then by removing the hopper 14 and sliding the cover plate 17 a slight distance to the left as viewed in Fig. 3 the elevating unit after removing the bolts 24a can be withdrawn from the tank. It will thus be seen that the several units of the machine can be quickly assembled or disconnected one from another and stored when not in use in a comparatively small space.

I claim as my invention:

1. A seed treating machine comprising a tank for holding a fluid in which the seed are deposited for treatment, an elevator within the tank projecting above and arranged to operate within the fluid and including members arranged to convey the seed therefrom, flexible seed supporting means disposed within and near the bottom of the tank in the path of said members arranged to be deflected thereby during operation of the elevator, means for receiving the seed from the elevator arranged to convey the same to a predetermined point, a device adjustable for deflecting the seed conveyed to said point into different paths to permit discharge of the seed into receptacles occupying different positions relative to said device, and means for operating the elevator.

2. In a seed treating machine, a tank for holding a fluid in which the seed are deposited for treatment, an elevator within the tank arranged to agitate the fluid and to convey the seed therefrom, a pivoted member within the lower portion of the tank at a predetermined point above the bottom thereof arranged to hold the seed against downward discharge from said point and free to be swung upwardly by the elevator during operation thereof means for receiving the seed raised by the elevator and means for effecting operation of the elevator.

3. In a seed treating machine, a tank for holding a fluid in which the seed are deposited for treatment, an elevator within the tank having spaced seed advancing portions thereon, a pivoted plate member having a normal seed supporting position within the lower portion of the tank above the lower end of the elevator arranged to be swung upwardly by said portions during operation of the elevator and automatically returning to normal position when released by said portions, means for receiving the seed raised by the elevator and means for operating the elevator.

4. In a seed treating machine, a tank for holding a fluid in which the seed are deposited for treatment, an elevator within the tank having seed advancing portions thereon arranged to agitate the fluid within the tank, a plate member pivoted within the lower portion of the tank at a predetermined point above the lower end of the elevator arranged to be periodically swung upwardly by said seed advancing portions and cooperating with the elevator in all positions thereof to hold the seed against downward discharge from said point, said plate member returning automatically to normal position upon release thereby by said advancing portions, means for supporting said plate member in normal position, and means for operating the elevator.

5. In a seed treating machine, a tank for holding a fluid in which the seed are deposited for treatment, an elevator within the tank for conveying the seed therefrom including spaced seed advancing members, the elevator having its upper end portion projecting from the tank, flexible means cooperating with the elevator within the tank near the bottom thereof to divide the latter into separate compartments and arranged to be deflected upwardly by the passage of said advancing members therebeneath, means for receiving the seed from the elevator, a trough-like member underlying the projecting portion of the elevator for catching the drippings discharging therefrom, said member being arranged to discharge into the tank, and means for effecting operation of the elevator.

6. In a seed treating machine, a tank for holding a fluid for treating the seed, an elevator for the seed fixed within the tank and dividing it into separate compartments, one for receiving the seed, the elevator having its upper end portion projecting from the tank, pivoted means within the tank above the lower end of the elevator forming the bottom of the seed holding compartment and free to be swung upwardly by the elevator during operation thereof, a chute for receiving the seed from the elevator, said chute having a perforated bottom for the escape of the drippings discharging from the seed descending upon said bottom, means beneath the chute for receiving said drippings, means underlying the projecting portion of the elevator arranged to catch the drippings discharging therefrom and to return the same to the tank, and means for effecting operation of the elevator.

7. In a seed treating machine, a tank for holding a fluid in which the seed are deposited for treatment, an elevator within the tank for conveying the seed from the fluid comprising a belt having spaced slat like members thereon, a flexible seed supporting element adjacent the bottom of the tank arranged to be deflected upwardly by the travel of said slat like members therebeneath, a chute for receiving the seed having its upper end extending beneath the discharge point of the elevator, the lower end of the chute being spaced above the base of the machine to permit of the insertion of one or more receptacles beneath said end, means adjustable within the lower end of the chute to vary the path of discharge of the seed therefrom whereby the seed may be delivered alternately to different receptacles or to different portions of a single receptacle, and means for effecting operation of the elevator.

8. In a seed treating machine, a tank for holding a fluid in which the seed are deposited for treatment, a detachable inclined elevating unit within the tank comprising spaced side rails inclined within and spaced from the walls of the tank, members projecting laterally from the rails and engaging the side walls of the tank to afford closed joints between the rails and said side walls, a pair of sprockets adjacent each side rail located at the upper and lower ends thereof, a chain engaging each pair of sprockets, a shaft connecting the upper sprockets, operating means for the shaft, a plurality of transversely extending strips having their opposite ends connected with said chains, a belt-like element cooperating with said strips to agitate the fluid and to convey the seed therefrom, and a seed supporting plate at the lower end of the elevating unit arranged in the path of travel of said strips and adapted to be deflected upwardly thereby.

WILLIAM E. GHENT.